(12) United States Patent
Sharma et al.

(10) Patent No.: US 10,051,068 B2
(45) Date of Patent: Aug. 14, 2018

(54) MECHANISMS TO ROUTE IOT NOTIFICATIONS ACCORDING TO USER ACTIVITY AND/OR PROXIMITY DETECTION

(71) Applicant: QUALCOMM Incorporated, San Diego, CA (US)

(72) Inventors: Sandeep Sharma, San Diego, CA (US); Binita Gupta, San Diego, CA (US); Mohammed Ataur Rahman Shuman, San Diego, CA (US); Amit Goel, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 14/539,076

(22) Filed: Nov. 12, 2014

(65) Prior Publication Data
US 2015/0134761 A1 May 14, 2015

Related U.S. Application Data

(60) Provisional application No. 61/904,355, filed on Nov. 14, 2013.

(51) Int. Cl.
*G06F 15/16* (2006.01)
*H04L 29/08* (2006.01)
(Continued)

(52) U.S. Cl.
CPC ............ *H04L 67/22* (2013.01); *H04L 65/403* (2013.01); *H04L 67/26* (2013.01); *H04W 4/021* (2013.01); *H04W 4/70* (2018.02); *H04W 4/90* (2018.02)

(58) Field of Classification Search
CPC ....... H04L 67/22; H04L 65/403; H04L 67/26; H04W 4/005; H04W 4/021; H04W 4/22
(Continued)

(56) References Cited

U.S. PATENT DOCUMENTS 8,230,466 B2  7/2012  Cockrell et al.
8,352,546 B1  1/2013  Dollard
(Continued)

FOREIGN PATENT DOCUMENTS

EP  1284069 B1  11/2004
EP  1708446 A1  10/2006
(Continued)

OTHER PUBLICATIONS

Blazevic L., et al., "A Location-Based Routing Method for Mobile Ad Hoc Networks", IEEE Transactions on Mobile Computing, IEEE, vol. 4, No. 2, 2004, pp. 97-110.
(Continued)

Primary Examiner — Joseph L Greene
(74) Attorney, Agent, or Firm — Muncy, Geissler, Olds & Lowe, P.C.

(57) ABSTRACT

The disclosure relates to mechanisms that may be used to route notifications in an Internet of Things (IoT) environment according to user activity and/or proximity detection. More particularly, in various embodiments, an entity that manages the IoT environment may receive one or more messages, actions, or responses that indicate detected activity or detected proximity associated with one or more users from one or more IoT devices in the IoT environment. The management entity may then establish an activity and proximity trail from the one or more messages, actions, or responses that indicate the detected activity or the detected proximity, whereby in response to an IoT device reporting one or more notifications, an IoT device in proximity to at
(Continued)

least one of the one or more users may be identified and the one or more notifications may be routed to the identified IoT device.

24 Claims, 13 Drawing Sheets

(51) Int. Cl.
*H04L 29/06* (2006.01)
*H04W 4/021* (2018.01)
*H04W 4/70* (2018.01)
*H04W 4/90* (2018.01)

(58) Field of Classification Search
USPC .......................................................... 709/207
See application file for complete search history.

(56) References Cited

U.S. PATENT DOCUMENTS

| | | | | |
|---|---|---|---|---|
| 2002/0143855 | A1* | 10/2002 | Traversat | G06F 9/4416 709/202 |
| 2003/0120751 | A1* | 6/2003 | Husain | H04L 41/0803 709/219 |
| 2004/0044776 | A1 | 3/2004 | Larkin | |
| 2004/0198319 | A1 | 10/2004 | Whelan et al. | |
| 2010/0228767 | A1 | 9/2010 | Slinker et al. | |
| 2011/0320487 | A1* | 12/2011 | Ghanea-Hercock | G06F 17/30206 707/769 |
| 2012/0079092 | A1* | 3/2012 | Woxblom | H04L 47/20 709/223 |
| 2012/0136957 | A1 | 5/2012 | Bellamy, III et al. | |
| 2013/0090139 | A1 | 4/2013 | McHenry et al. | |
| 2013/0195091 | A1 | 8/2013 | Gibbs et al. | |
| 2013/0222133 | A1 | 8/2013 | Schultz et al. | |
| 2013/0329000 | A1* | 12/2013 | Cain | H04N 7/152 348/14.08 |
| 2014/0082702 | A1 | 3/2014 | Supalla | |
| 2014/0244001 | A1 | 8/2014 | Glickfield et al. | |
| 2014/0244568 | A1 | 8/2014 | Goel et al. | |
| 2014/0274007 | A1* | 9/2014 | Detter | H04M 3/54 455/417 |
| 2015/0019714 | A1* | 1/2015 | Shaashua | H04L 67/24 709/224 |
| 2015/0081904 | A1 | 3/2015 | Guedalia et al. | |
| 2015/0127733 | A1* | 5/2015 | Ding | H04W 4/08 709/204 |

FOREIGN PATENT DOCUMENTS

| | | |
|---|---|---|
| EP | 2045970 A1 | 4/2009 |
| EP | 2574026 A1 | 3/2013 |
| WO | 2007098468 A1 | 8/2007 |
| WO | 2007125421 A2 | 11/2007 |
| WO | 2012166671 A1 | 12/2012 |
| WO | 2013086363 A2 | 6/2013 |
| WO | 2013123445 A1 | 8/2013 |

OTHER PUBLICATIONS

Brodkin J., "Open source will let your fridge send messages to your TV and phone," Dec. 10, 2013, [Retrieved dated on Sep. 22, 2014], Retrieved from the Internet < URL: http://arstechnica.com/information-technology/2013/12/open-source-will-let-your-fridge-send-messages-to-your-tv-and-phone/ >, 4 Pages.

Guo B., et al., "From the internet of things to embedded intelligence," 2012, pp. 1-29.

Interdigital, "Standardized Machine-to-Machine (M2M) Software Development Platform," White Paper, Oct. 2012, pp. 1-20.

Shah S. H., et al., "Predictive Location-Based QoS Routing in Mobile Ad Hoc Networks", IEEE International Conference on Communications, IEEE, vol. 2, 2002, pp. 1022-1027.

International Search Report and Written Opinion—PCT/US2014/065547—ISA/EPO—Mar. 27, 2015.

* cited by examiner

MECHANISMS TO ROUTE IOT NOTIFICATIONS ACCORDING TO USER ACTIVITY AND/OR PROXIMITY DETECTION

CROSS-REFERENCE TO RELATED APPLICATIONS

The present Application for Patent claims the benefit of Provisional Patent Application No. 61/904,355 entitled "MECHANISMS TO ROUTE IOT NOTIFICATIONS ACCORDING TO USER ACTIVITY AND/OR PROXIMITY DETECTION," filed Nov. 14, 2013, and assigned to the assignee hereof and hereby expressly incorporated herein by reference in its entirety.

TECHNICAL FIELD

Various embodiments described herein generally relate to mechanisms to route notifications across one or more sub-networks associated with an Internet of Things (IoT) environment according to user activity and/or proximity detection.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous smart IoT devices surrounding a user at home, in vehicles, at work, and many other locations, wherein the various smart IoT devices in any particular IoT environment may have varying types and functionalities with each smart IoT device generally performing specific functions in relation to specific tasks. Consequently, when a particular IoT device needs to communicate a notification associated with a particular service to a user that may be away from the IoT device, problems may arise due to the need to communicate the notification to the user through some other IoT device, which may have a different type from the IoT device that needs to communicate the notification or otherwise lack the ability to process the notification.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, an Internet of Things (IoT) environment may have multiple IoT devices connected on a local proximal IoT network arranged in different groups or sets, which may potentially be associated with different locations or other personal spaces. Accordingly, the mechanisms disclosed herein may support routing or otherwise delivering notifications that one or more connected IoT devices generate to indicate certain events and state changes to a user that may be away from the connected IoT device(s) that generated the notification(s) and thereby enable the user to promptly receive the notifications and take appropriate action.

According to one exemplary aspect, notifications may be routed between different IoT devices in an IoT environment according to user activity and/or proximity detection. More particularly, in various embodiments, the IoT environment may comprise a suitable management entity that can track a location associated with a user within the IoT environment and route notifications to the user via nearby IoT devices that have appropriate notification capabilities. For example, in various embodiments, the management entity may generally encapsulate gateway functionality and facilitate communication between various IoT devices in the IoT environment, whereby each IoT device in the environment may send notifications to the management entity in response to detecting activity associated with the user and/or in response to detecting the user in proximity thereto. For example, the notifications sent to the management entity may indicate active interactions in which the user directly or indirectly interacted with an IoT device. In another example, the notifications sent to the management entity may indicate passive interactions in which an IoT device equipped with proximity and/or presence sensors detected the user without the user having directly or indirectly interacted therewith. Furthermore, in certain use cases, the user may have a wearable device that can periodically send activity and/or proximity indicators to the management entity, wherein the activity and/or proximity indicators may describe activities that the user performs, current location information associated with the user, any IoT devices located near the user that have suitable notification capabilities, and/or other relevant activity and/or proximity information associated with the user.

According to one exemplary aspect, the management entity may track and use the activity and/or proximity indicators that are sent within the IoT environment to maintain a user activity and proximity trail that can be referenced to determine how to suitably route a notification to the user. Furthermore, in various embodiments, the management entity may know the notification capabilities associated with the various IoT devices in the IoT environment and thereby determine where to route the notifications based on the latest activity and/or proximity indicators that were received and the particular notification capabilities associated with the various IoT devices in the IoT environment. As such, in response to receiving a notification, the management entity may identify one or more IoT devices that most recently reported an active or passive trailing event associated with the user according to the user activity and proximity trail and probabilistic determination. Furthermore, in various embodiments, the management entity may have rules that control how the notification should be translated into a format that can be processed and presented through the IoT devices that will eventually deliver the notification to the user and may have further rules to expire the user activity and/or proximity indicators reported thereto to prevent routing the notifications according to stale information.

According to one exemplary aspect, a method for routing IoT notifications may comprise receiving one or more messages, actions, or responses that indicate detected activity or detected proximity associated with one or more users from one or more IoT devices in an IoT environment, establishing an activity and proximity trail from the one or more messages, actions, or responses that indicate the detected activity or the detected proximity, identifying an IoT device in proximity to at least one of the one or more users in response to an IoT device reporting one or more notifications, and routing the one or more notifications to the identified IoT device.

According to one exemplary aspect, an apparatus may comprise a receiver configured to receive one or more messages, actions, or responses that indicate detected activity or detected proximity associated with one or more users from one or more IoT devices in an IoT environment, one or more processors configured to establish an activity and proximity trail from the one or more messages, actions, or responses that indicate the detected activity or the detected proximity and identify an IoT device in proximity to at least one of the one or more users in response to an IoT device reporting one or more notifications, and a transmitter configured to route the one or more notifications to the identified IoT device.

According to one exemplary aspect, an apparatus may comprise means for receiving one or more messages, actions, or responses that indicate detected activity or detected proximity associated with one or more users from one or more IoT devices in an IoT environment, means for establishing an activity and proximity trail from the one or more messages, actions, or responses that indicate the detected activity or the detected proximity, means for identifying an IoT device in proximity to at least one of the one or more users in response to an IoT device reporting one or more notifications, and means for routing the one or more notifications to the identified IoT device.

According to one exemplary aspect, a computer-readable storage medium may have computer-executable instructions for routing IoT notifications recorded thereon, wherein executing the computer-executable instructions on one or more processors may cause the one or more processors to receive one or more messages, actions, or responses that indicate detected activity or detected proximity associated with one or more users from one or more IoT devices in an IoT environment, establish an activity and proximity trail from the one or more messages, actions, or responses that indicate the detected activity or the detected proximity, identify an IoT device in proximity to at least one of the one or more users in response to an IoT device reporting one or more notifications, and route the one or more notifications to the identified IoT device.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
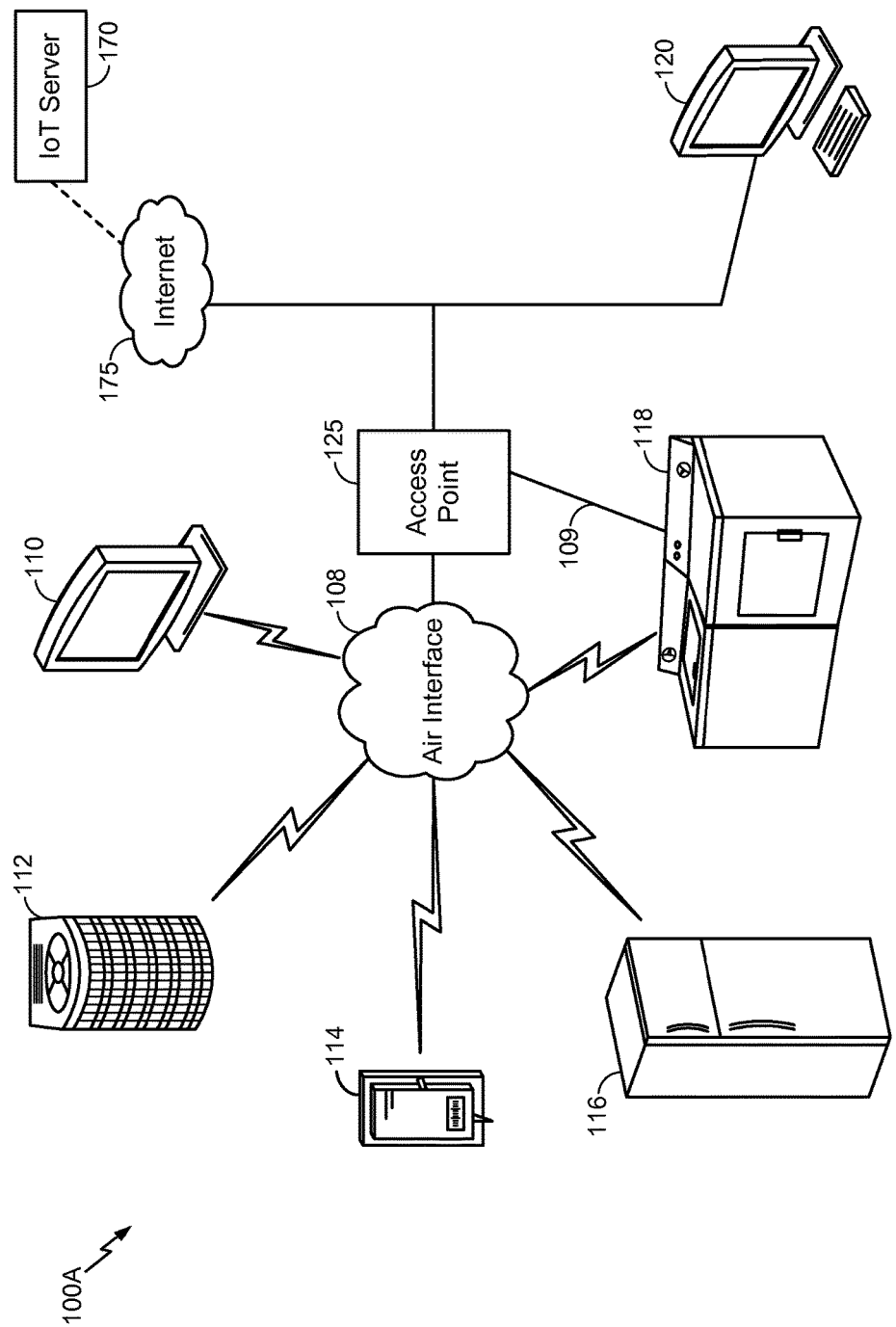
FIG. 1A illustrates a high-level system architecture of a wireless communications system in accordance with an aspect of the disclosure.

Various aspects are disclosed in the following description and related drawings to show specific examples relating to exemplary aspects and embodiments disclosed herein. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
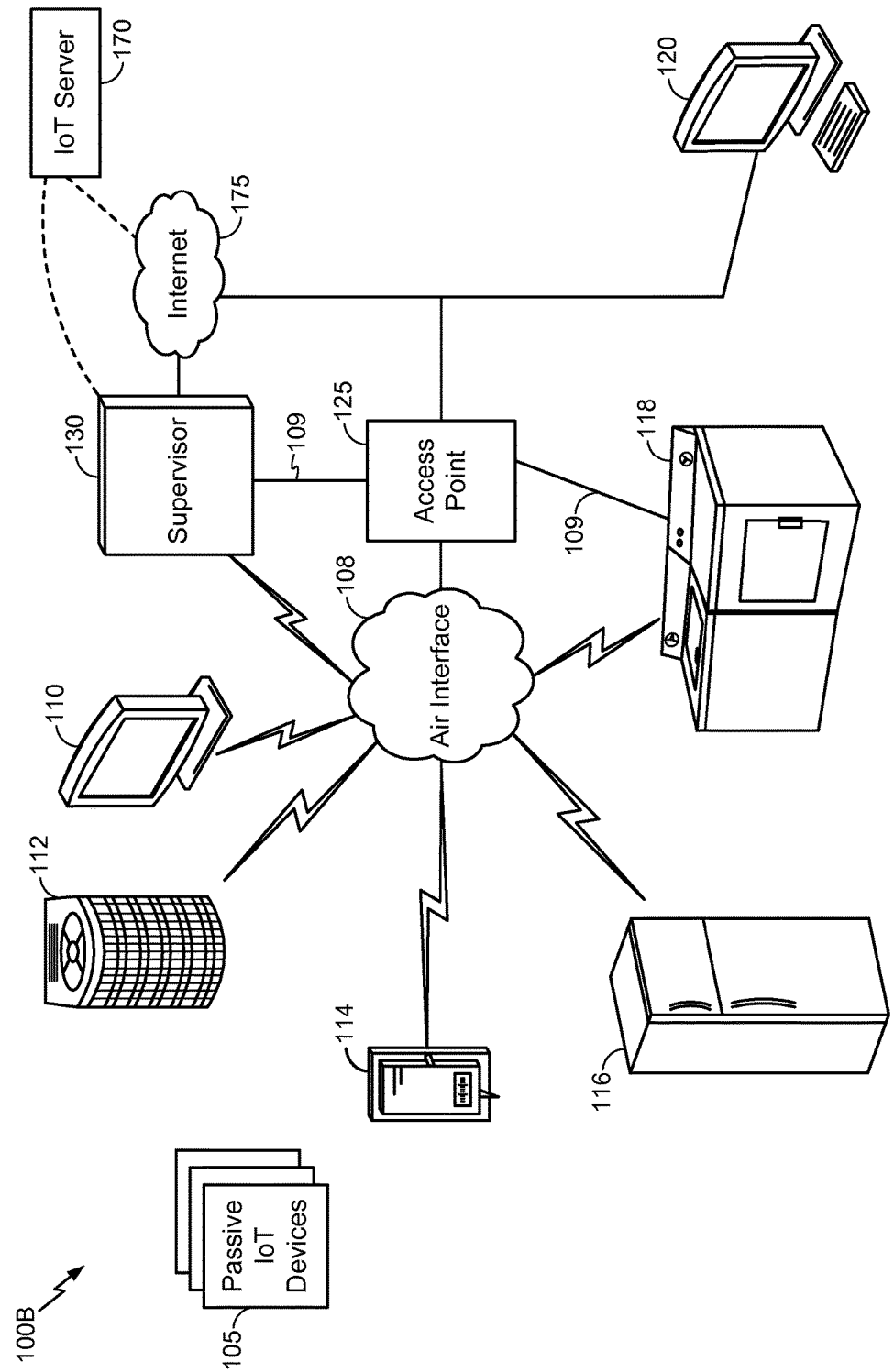
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In various embodiments, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
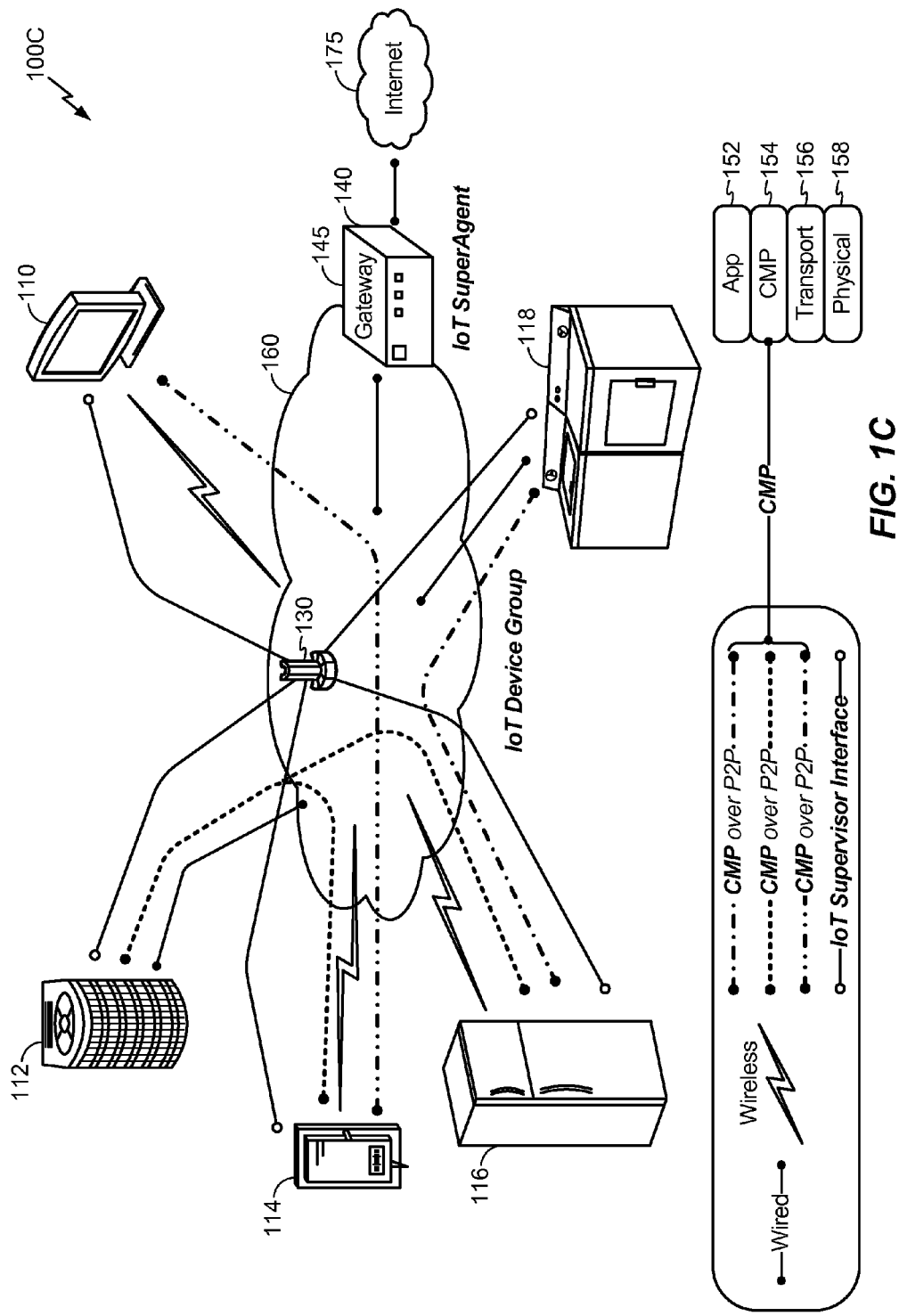
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
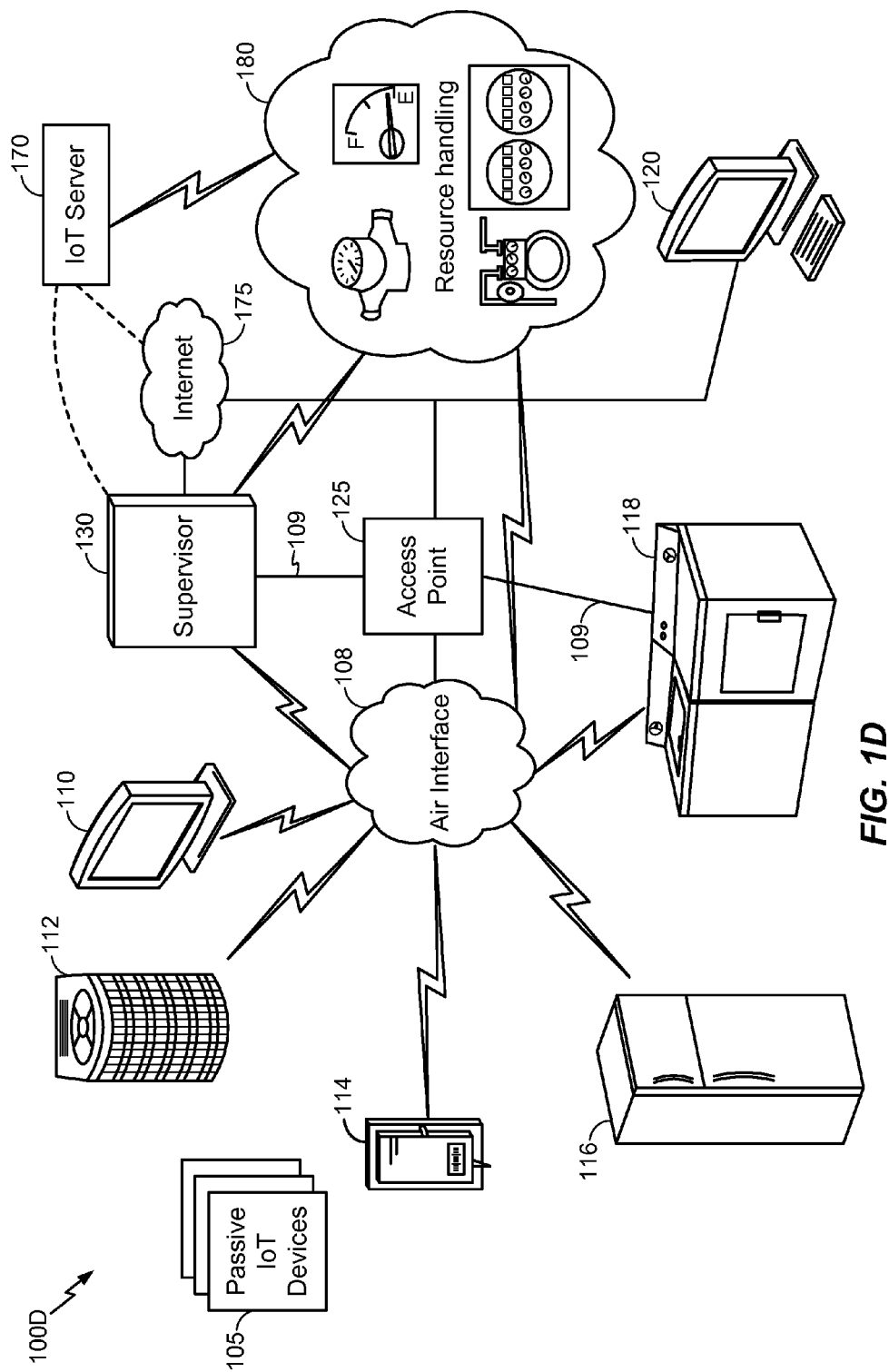
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-100C shown in FIGS. 1A-1C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-100C illustrated in FIGS. 1A-1C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
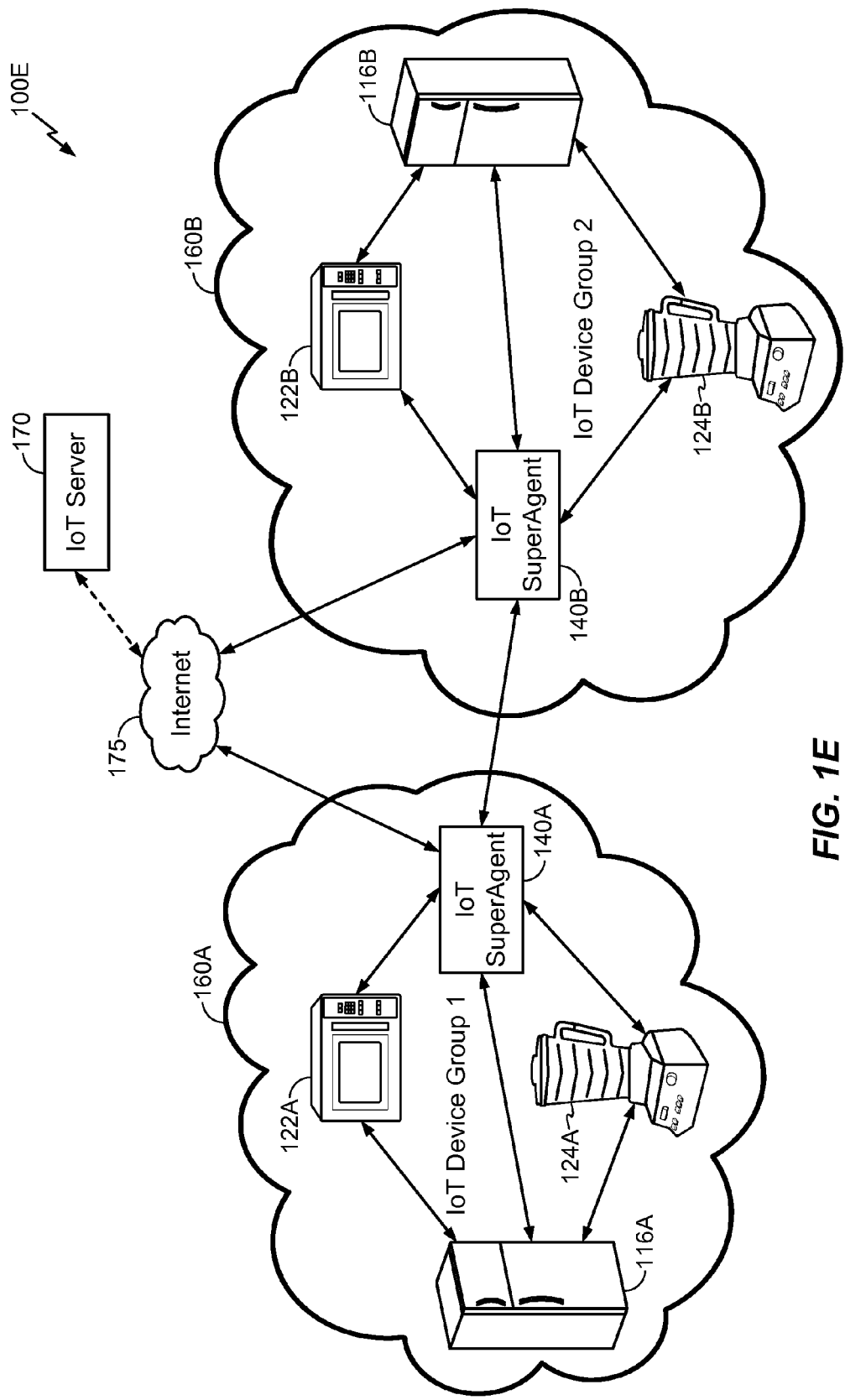
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-100D shown in FIGS. 1A-1D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-100D illustrated in FIGS. 1A-1D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT Super-Agents.

Figure 2A:
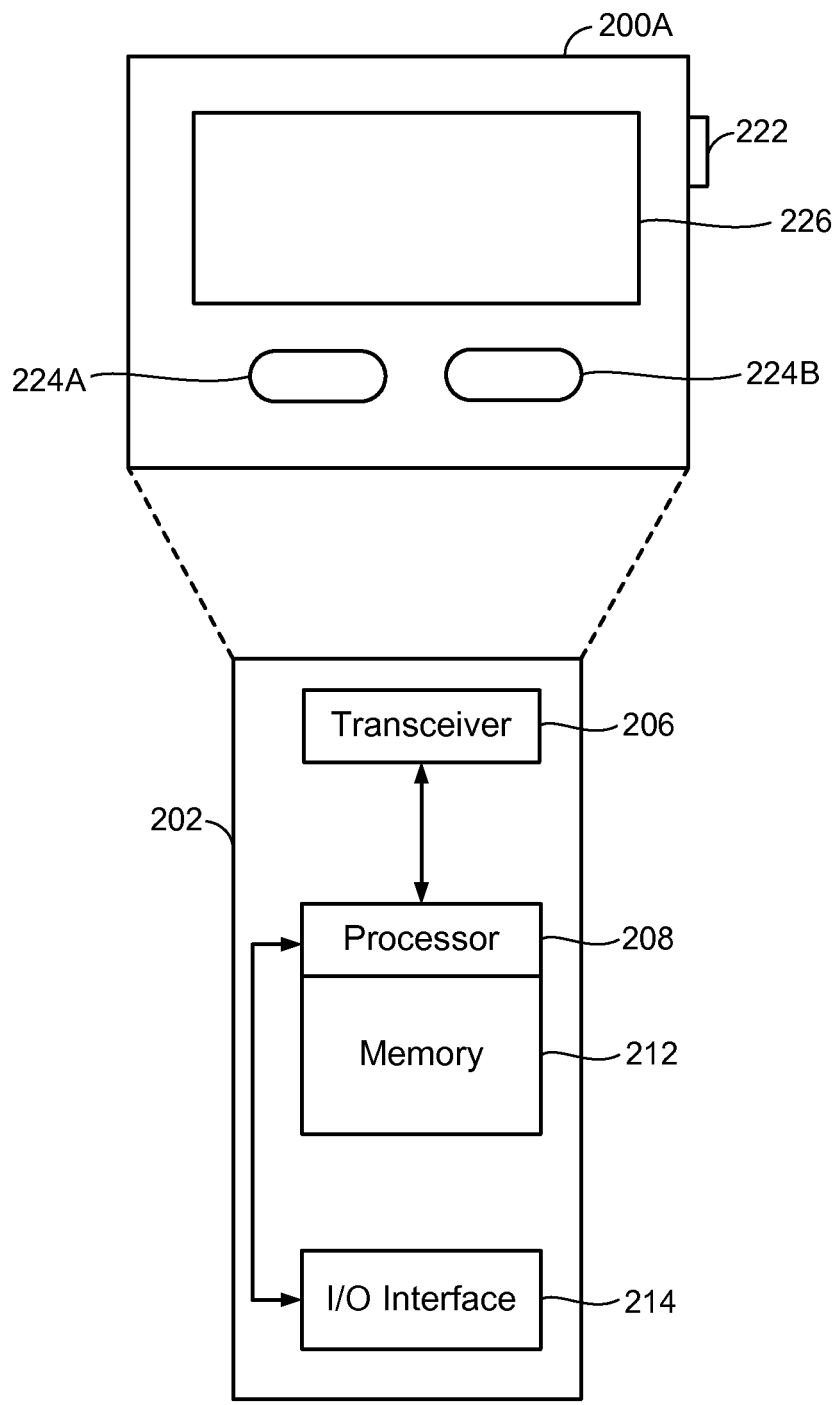

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-1B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-1B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
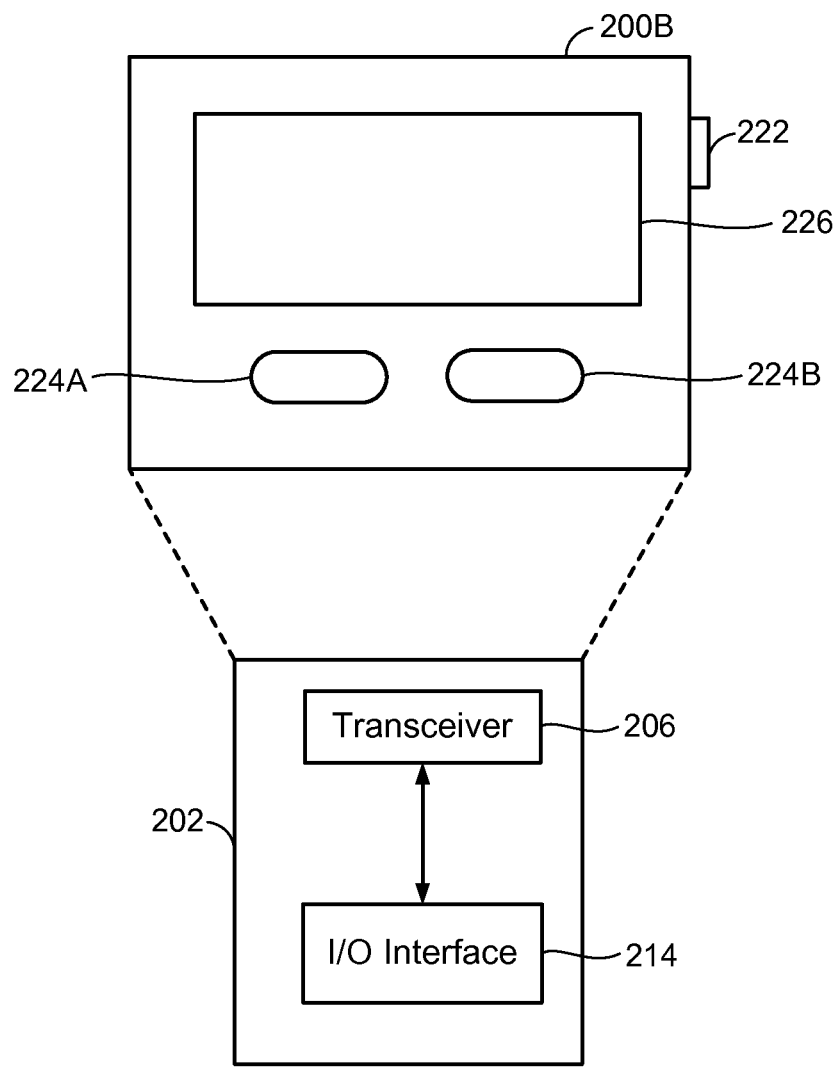
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in various embodiments, the passive IoT device 200B may only include an I/O interface 214 or other suitable mechanism that allows the passive IoT device 200B to be observed, monitored, controlled, managed, or otherwise known within a controlled IoT network. For example, in various embodiments, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
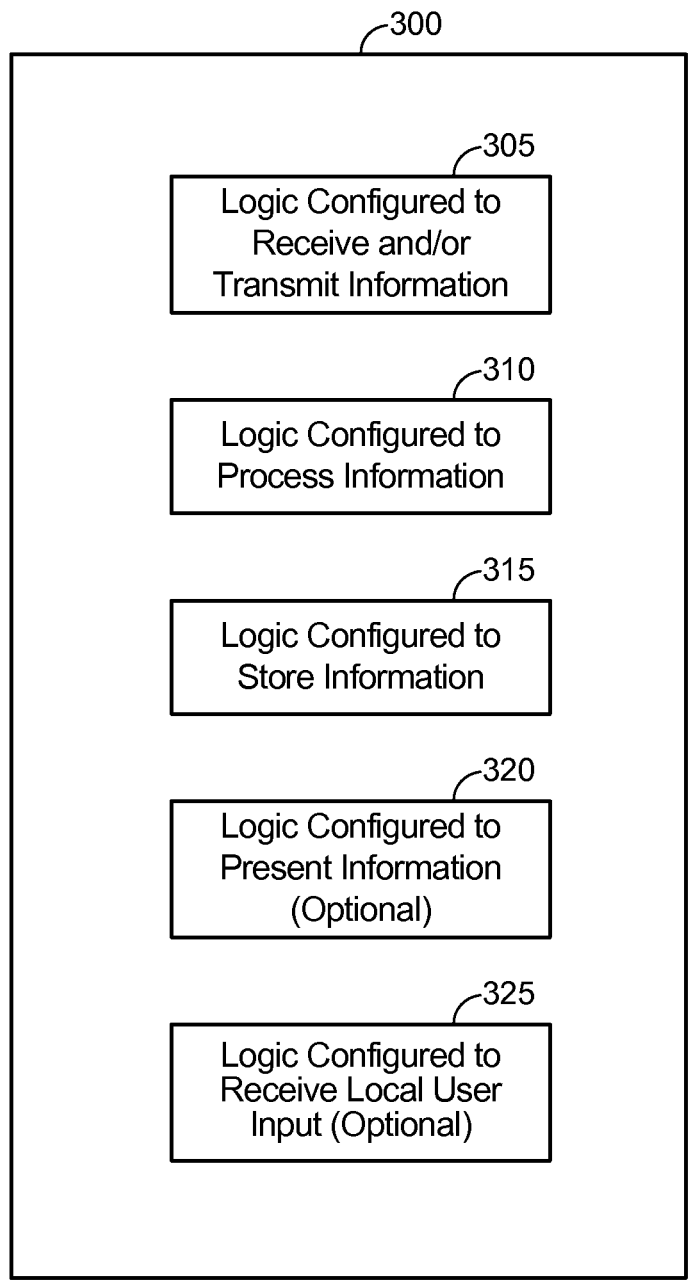
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-100E of FIGS. 1A-1E.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
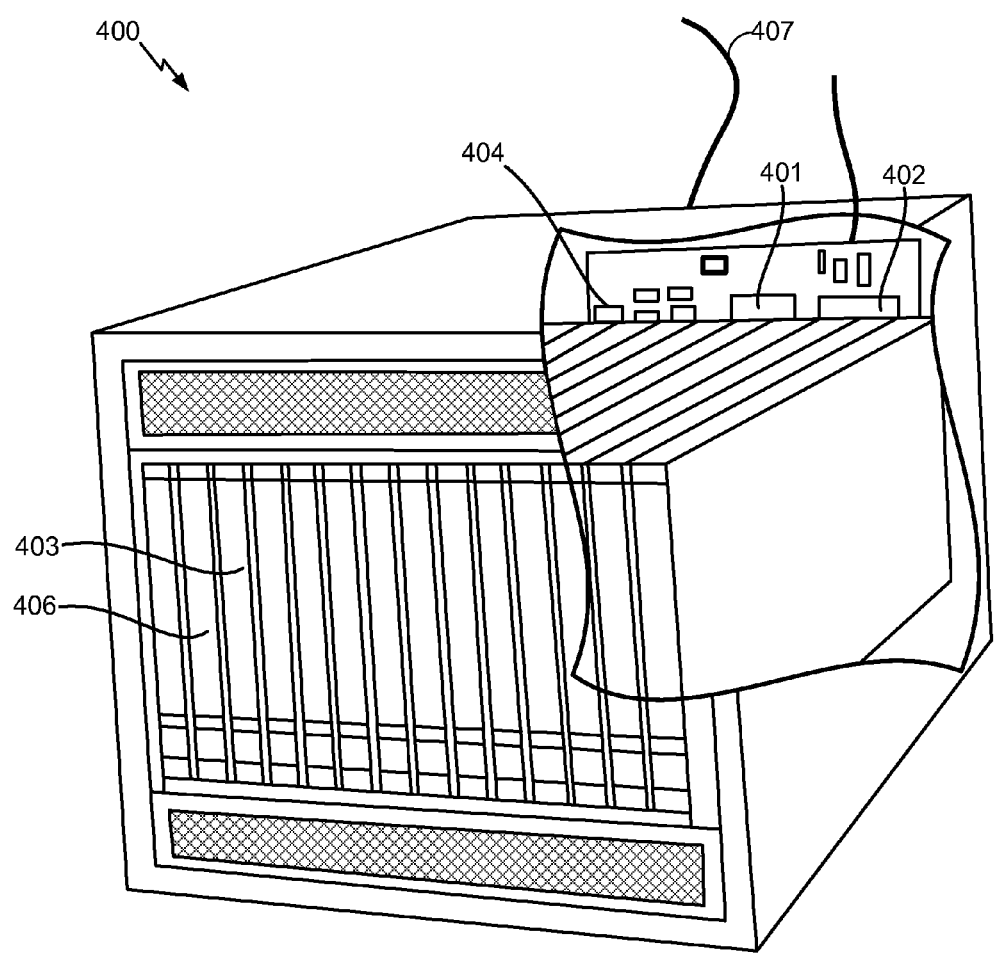
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In general, the increasing development in IoT technologies will lead to numerous IoT devices surrounding users in their homes, vehicles, workplaces, and many other locations or personal spaces. Consequently, any particular IoT environment may have multiple connected IoT devices arranged in different groups or sets that may be associated with different locations or other personal spaces, which may all be connected on a local proximal IoT network. Furthermore, the IoT devices connected on the local proximal IoT network may generate notifications about certain events and state changes, which may raise problems when a particular IoT device needs to notify a user about an emergency or other event or state change when the user may be away from the IoT device that generated the notification. Accordingly, the following description generally provides a mechanism to route urgent or otherwise important notifications that relate to emergency or other high-priority events that may require immediate attention in order to enable the user to promptly receive the notifications and take appropriate corrective action. However, those skilled in the art will appreciate that the same and/or substantially similar mechanisms may be used to route or otherwise deliver any suitable notifications, whether urgent or not. Furthermore, those skilled in the art will appreciate that the various delivery mechanisms described herein may be used to route notifications in a generic manner (e.g., to any suitable user), a personalized manner (e.g., to a particular user), or any suitable combination thereof.

Figure 5:
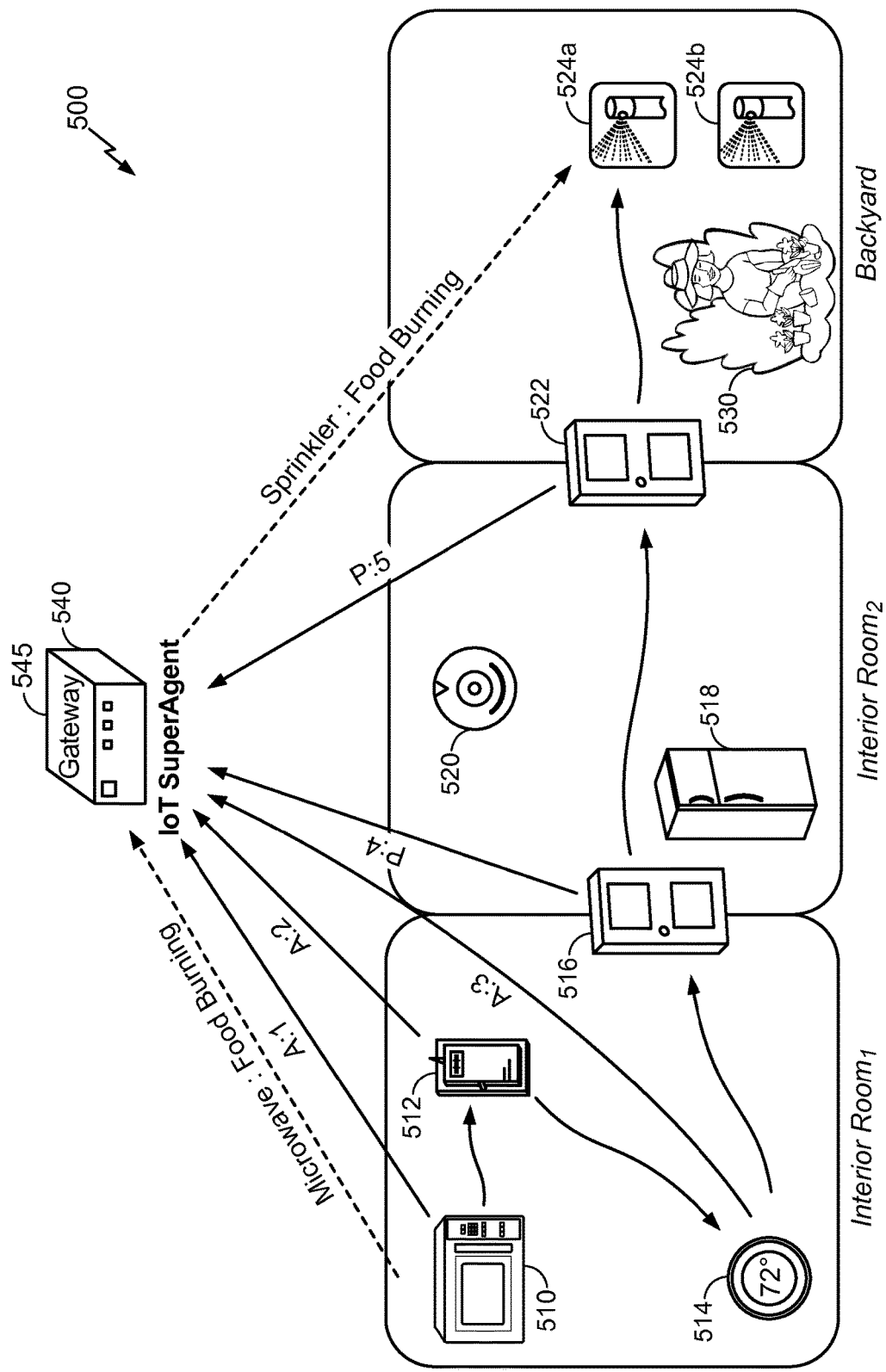
FIG. 5 illustrates an exemplary IoT environment in which notifications may be routed between different IoT devices according to user activity and/or proximity detection, according to one aspect of the disclosure.

More particularly, according to one aspect of the disclosure, FIG. 5 illustrates an exemplary IoT environment 500 in which notifications may be routed between different IoT devices according to user activity and/or proximity detection. In various embodiments, the IoT environment 500 shown in FIG. 5 may comprise, among other things, an IoT SuperAgent 540 that may track a location associated with a user 530 within the IoT environment 500 and route notifications to the user 530 using IoT devices that are in nearby proximity to the user 530 and have notification capabilities. In various embodiments, as described in further detail above with respect to FIG. 1C and FIG. 1E, the IoT SuperAgent 540 may generally encapsulate gateway functionality 545 and facilitate communication between various IoT devices in the IoT environment 500. For example, the exemplary IoT environment 500 shown in FIG. 5 may include a microwave IoT device 510, a thermostat IoT device 512, and a temperature display IoT device 514 located in a first personal space (e.g., Interior Room$_1$), a speaker IoT device 520 and a refrigerator IoT device 518 located in a second personal space (e.g., Interior Room$_2$), and one or more sprinkler IoT devices 524a, 524b located in a third personal space (e.g., Backyard). Furthermore, the IoT environment 500 may a first doorway IoT device 516 that connects Interior Room$_1$ to Interior Room$_2$ and a second doorway IoT device 522 that connects Interior Room$_2$ to the Backyard. However, those skilled in the art will appreciate that the above-mentioned IoT devices are merely illustrative, wherein any particular IoT environment 500 may include different IoT devices arranged in different personal spaces in different ways In various embodiments, each IoT device in the IoT environment may send notifications to the IoT SuperAgent 540 in response to detecting activity associated with the user 530 and/or in response to detecting the user 530 in proximity thereto. For example, the notifications sent to the IoT SuperAgent 540 may indicate active interactions in which the user 530 directly or indirectly interacted with an IoT device (e.g., the user 530 turned on the microwave IoT device 510, opened or closed the refrigerator IoT device 518, took water or ice from the refrigerator IoT device 518, changed the temperature setting on the thermostat IoT device 512, opened the first doorway IoT device 516, interacted with a television IoT device (not shown) either directly or via remote control, etc.). In another example, the notifications sent to the IoT SuperAgent 540 may indicate passive interactions in which an IoT device equipped with proximity and/or presence sensors detected the user 530 without the user 530 having directly or indirectly interacted therewith. Furthermore, in certain use cases, a wearable device on the user 530 (e.g., a Fitbit activity tracker, watch, etc.) may periodically send the IoT SuperAgent 540 activity and/or proximity indicators that describe activities that the user 530 performs, current location information associated with the user 530, any IoT devices located near the user 530 that have suitable notification capabilities, and/or other relevant activity and/or proximity information associated with the user 530.

Accordingly, in various embodiments, the IoT SuperAgent 540 may track the activity and/or proximity indicators that are sent within the IoT environment 500 and use the tracked activity and/or proximity indicators to maintain a user activity and proximity trail that can be referenced to determine how to suitably route a notification to the user 530. Furthermore, in various embodiments, the IoT SuperAgent 540 may know the notification capabilities associated with the various IoT devices in the IoT environment 500 and determine where to route the notifications based on the latest activity and/or proximity indicators that were received and the particular notification capabilities associated with the various IoT devices in the IoT environment 500. For example, in various embodiments, the refrigerator IoT device 518 and a washer/dryer IoT device (not shown) may have displays that can provide visual notifications to the user 530, the speaker IoT device 520 may play a distinct sound to provide audible notifications to the user 530, and the sprinkler IoT devices 524a, 524b may have capabilities to emit water in a distinctive pattern (e.g., in three quick spurts) to notify the user 530. As such, in response to receiving a notification, the IoT SuperAgent 540 may identify one or more IoT devices that most recently reported an active or passive trailing event associated with the user 530, whereby the IoT SuperAgent 540 may reference the user activity and proximity trail to identify one or more IoT devices in proximity to the user 530 according to a probabilistic determination (e.g., if the user 530 typically begins a work day with starting a coffee maker first thing in the morning and then taking a shower before returning to the coffee maker, the IoT SuperAgent 540 may probabilistically determine that the user 530 will soon be in proximity to the coffee maker if the shower reports an active trailing event in which the user 530 turned off the shower). Furthermore, the IoT SuperAgent 540 may have rules that control how to translate the notification into a format that can be processed and presented through the IoT devices in proximity to the user 530 that will eventually deliver the notification to the user 530 and may have further rules to expire the user activity and/or proximity indicators reported thereto to prevent routing the notifications according to stale information (e.g., the user activity and/or proximity indicators may be expired after a predetermined time period, in response to a proximity indicator reporting that the user 530 has substantially changed locations, such as leaving home and heading to work, etc.).

In various embodiments, an exemplary use case detailing how the IoT SuperAgent 540 may route a notification according to user activity and/or proximity detection will now be described with particular reference to FIG. 5. For example, in response to the user 530 turning on the microwave IoT device 510 located in Interior Room$_1$, the IoT SuperAgent 540 may receive a first active interaction indicator A:1 from the microwave IoT device 510. The user 530 may then change the temperature setting on the thermostat IoT device 512 and check the temperature display IoT device 514 located in Interior Room$_1$, wherein the thermostat IoT device 512 and the temperature display IoT device 514 may respectively report second and third active interaction indicators A:2 and A:3 to the IoT SuperAgent 540. In response to the user 530 subsequently passing through the first doorway IoT device 516 that connects Interior Room$_1$ to Interior Room$_2$ and through the second doorway IoT device 522 that connects Interior Room$_2$ to the Backyard, the first doorway IoT device 516 and the second doorway IoT device 522 may respectively report first and second passive interaction indicators P:4 and P:5 to the to the IoT SuperAgent 540. Based on the active interaction indicators A:1 through A:3 and the passive interaction indicators P:4 and P:5, the IoT SuperAgent 540 may establish an activity and proximity trail associated with the user 530. In response to receiving a notification from the microwave IoT device 510 indicating that food is burning at some subsequent point in time, the IoT SuperAgent 540 may reference the activity and proximity trail to determine that the user 530 is located in the Backyard in proximity to the sprinkler IoT devices 524a, 524b (e.g., because the last trailing event was reported from the second doorway IoT device 522 that connects Interior Room$_2$ to the Backyard where the sprinkler IoT devices 524a, 524b are located). Accordingly, because the sprinkler IoT devices 524a, 524b may not have the capability to visually or audibly notify the user 530, the IoT SuperAgent 540 may translate the message from the microwave IoT device 510 indicating that food is burning into a format that the sprinkler IoT devices 524a, 524b can process. The translated message may then be routed to the sprinkler IoT devices 524a, 524b, wherein the translated message may cause the sprinkler IoT devices 524a, 524b to emit water in a distinctive pattern to thereby present the notification to the user 530. Furthermore, because the notification presented through the sprinkler IoT devices 524a, 524b may be somewhat ambiguous in relation to the particular emergency, the IoT SuperAgent 540 may further translate the notification and route the translated notification to other IoT devices based on subsequent state changes associated with the user. For example, if the user again passes through the second doorway IoT device 522, the IoT SuperAgent 540 may deduce that the user 530 has re-entered Interior Room2 and route the notification to the refrigerator IoT device 518 that can display visual information to specifically indicate that food is burning in the microwave IoT device 510.

Figure 6:
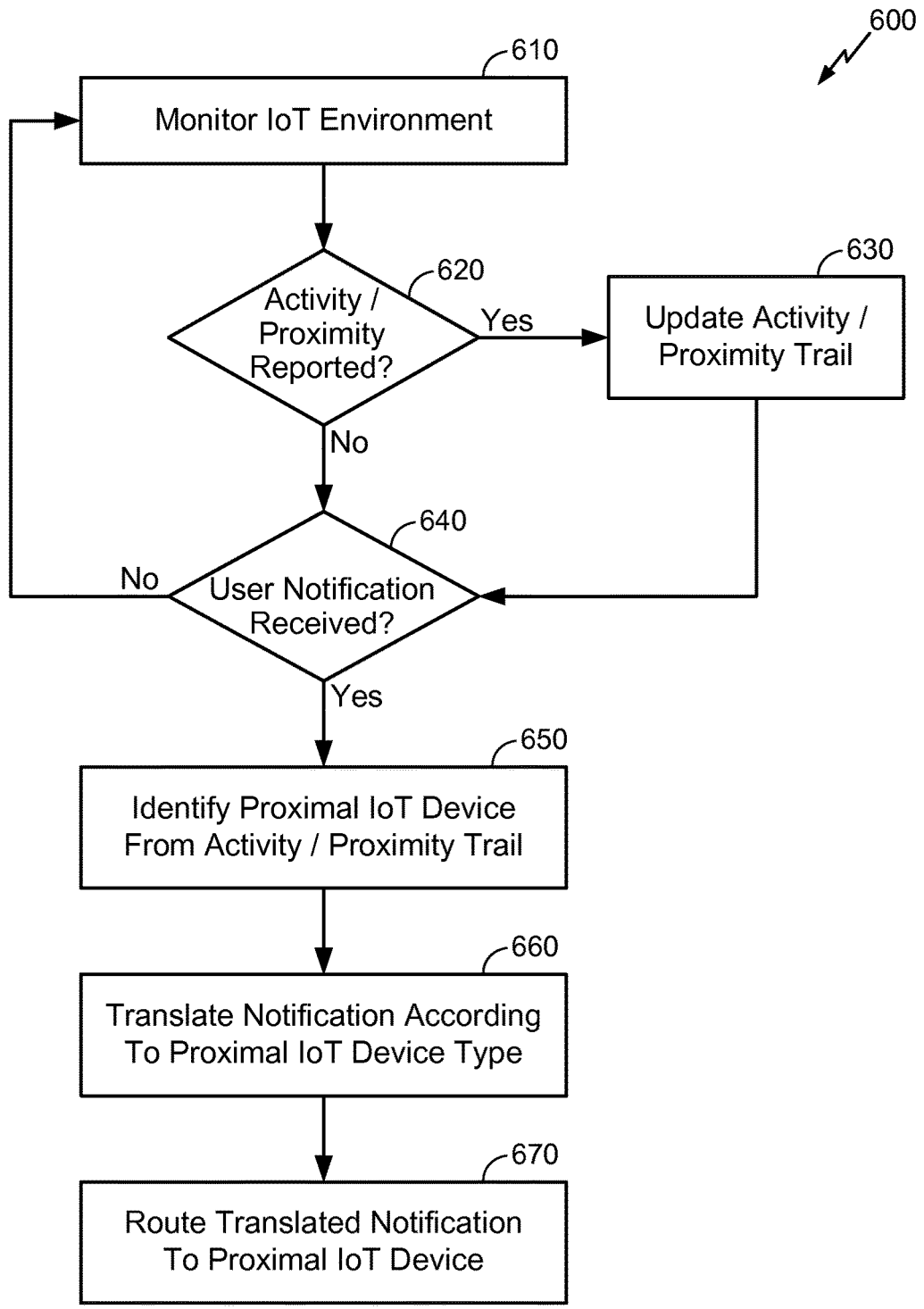
FIG. 6 illustrates an exemplary method that may be used to route notifications between different IoT devices in an IoT environment according to user activity and/or proximity detection, according to one aspect of the disclosure.

According to one aspect of the disclosure, FIG. 6 illustrates an exemplary method 600 that may be used to route notifications between different IoT devices in an IoT environment according to user activity and/or proximity detection. In particular, an IoT SuperAgent may generally monitor an IoT environment in a substantially continuous manner at block 610 to receive activity and/or proximity indicators from any IoT devices within the IoT environment that detect active and/or passive interactions associated with a user and further to receive notifications from any IoT devices within the IoT environment (e.g., IoT devices that detect emergency or other high-priority events or state changes). As such, in response to receiving activity and/or proximity indications reported from one or more IoT devices at block 620, the IoT SuperAgent may appropriately update an activity and proximity trail associated with the user at block 630. For example, the activity and/or proximity indications reported to the IoT SuperAgent may indicate active interactions in which the user directly or indirectly interacted with an IoT device and/or passive interactions in which an IoT device detected the user in proximity thereto (e.g., using proximity and/or presence sensors) without the user directly or indirectly interacted therewith. Furthermore, in various embodiments, the user may have a wearable device (e.g., a Fitbit activity tracker, watch, etc.) that periodically reports activity and/or proximity indicators to the IoT SuperAgent in order to indicate activities that the user performs, current location information associated with the user, any IoT devices located near the user that have suitable notification capabilities, and/or other relevant activity and/or proximity information associated with the user.

Accordingly, in various embodiments, the IoT SuperAgent may update the activity and proximity trail associated with the user at block 630 to track the activity and/or proximity indicators that are sent within the IoT environment and determine how to route a notification to the user. Furthermore, in various embodiments, updating the activity and proximity trail associated with the user at block 630 may include expiring certain user activity and/or proximity indicators that were previously reported thereto according to certain rules in order to prevent routing notifications according to stale information (e.g., the user activity and/or proximity indicators may be expired at block 630 after a predetermined time period, in response to a proximity indicator reporting that the user has substantially changed locations, such as leaving home and heading to work, etc.).

In various embodiments, in response to determining that a notification was received from one or more IoT devices at block 640, the IoT SuperAgent may then identify one or more IoT devices proximal to the user at block 650, wherein the IoT devices may be identified based on a probabilistic determination and the most recently reported active or passive trailing events. In various embodiments, block 660 may comprise translating the notification into a format that can be processed and presented through the IoT devices that were identified at block 650 and route the translated notification to the identified proximal IoT device at block 670. Accordingly, the proximal IoT device may receive the translated notification from the IoT SuperAgent, wherein the translated notification may cause the proximal IoT device to deliver the notification to the user according to the capabilities associated therewith. For example, in various embodiments, the proximal IoT device may visually notify the user if the proximal IoT device has display capabilities, audibly notify the user if the proximal IoT device has audio output capabilities, and/or provide a visual and audible notification to the user if the proximal IoT device has both display and audio output capabilities. In another example, if the proximal IoT device does not have display capabilities or audio output capabilities, the translated notification may cause the proximal IoT device to perform some distinctive action that may signify the notification (e.g., a sprinkler IoT device may emit water in a distinctive pattern to notify the user). In any case, the notification may be appropriately routed to the proximal IoT device to enable the user to promptly receive the notification and take appropriate action.

Figure 7:
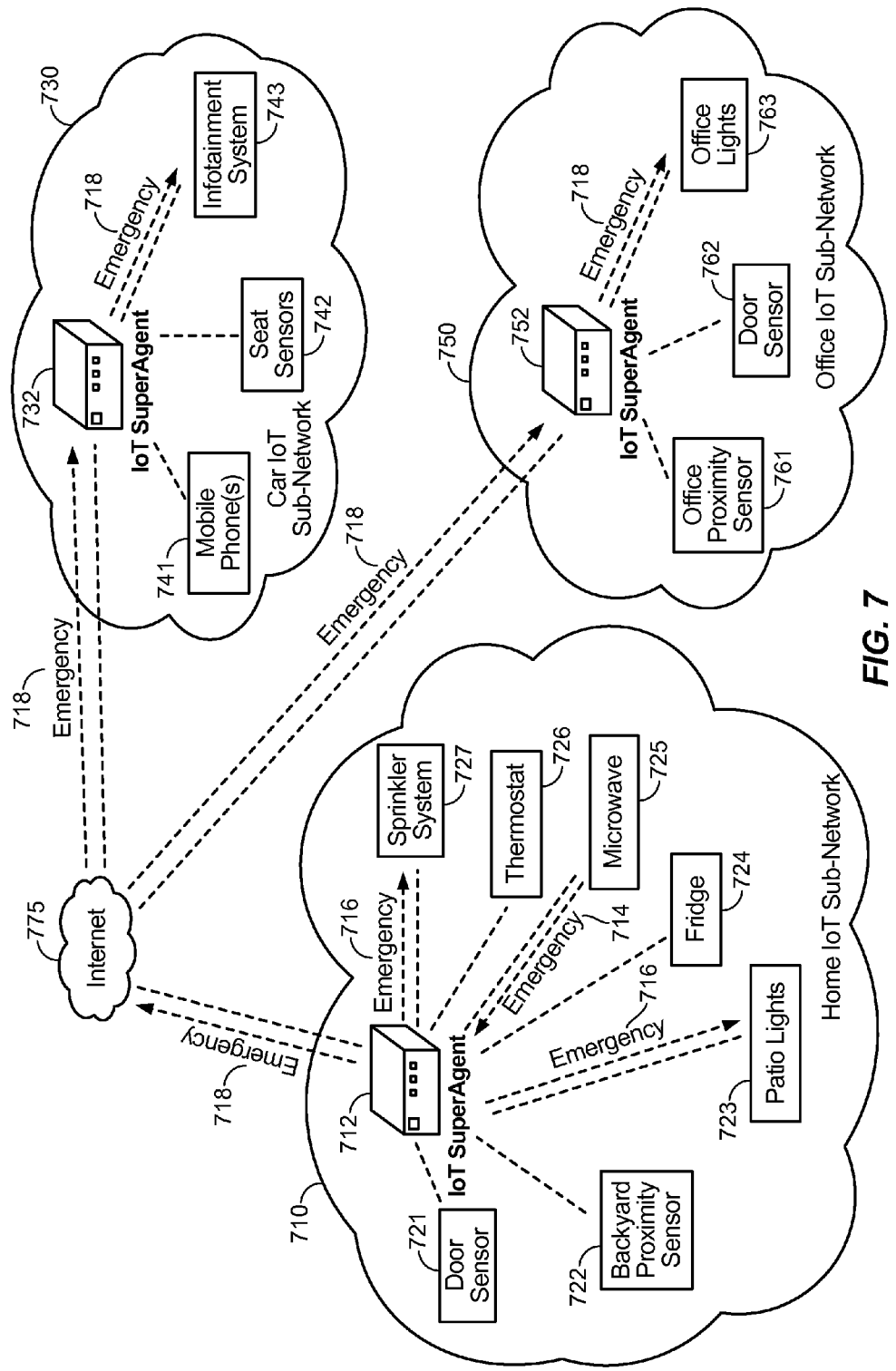
FIG. 7 illustrates an exemplary IoT environment in which notifications may be routed to one or more IoT devices in a local proximal cloud and/or one or more external proximal clouds according to user activity and/or proximity detection, according to one aspect of the disclosure.

According to one aspect of the disclosure, FIG. 7 illustrates an exemplary IoT environment in which notifications may be routed to one or more IoT devices in a local proximal cloud and/or one or more external proximal clouds according to user activity and/or proximity detection. More particularly, as will be described in further detail herein, one or more user notifications may be associated with a severity or criticality level, which may be used in combination with a time-to-live (TTL) value and user context information based on a user activity and proximity trail to determine a number of target IoT devices to receive the user notifications and to control routing the user notifications to one or more IoT devices in a local proximal cloud and/or one or more external proximal clouds.

According to various embodiments, the example IoT environment shown in FIG. 7 may generally include a home IoT sub-network 710, a car IoT sub-network 730, and an office IoT sub-network 750 connected to one another over the Internet 775. In that context, the local proximal cloud associated with a particular user notification may correspond to the IoT sub-network 710, 730, 750 in which the user notification originated and the other IoT sub-networks may represent external proximal clouds with respect to that user notification. Accordingly, the home IoT sub-network 710, the car IoT sub-network 730, and the office IoT sub-network 750 may each have a respective IoT SuperAgent 712, 732, 752 configured to receive user notifications from IoT devices in the local proximal cloud associated therewith, ascertain a number of target IoT devices to receive the user notifications based on severity or criticality levels associated therewith, and route the user notifications to the ascertained number of target IoT devices within the local proximal cloud and/or one or more external proximal clouds according to the severity or criticality levels associated with the user notifications, TTL values associated with the user notifications, and/or user context information (e.g., whether a user activity and proximity trail indicates that certain target users are present in the local proximal cloud or one or more external proximal clouds, whether a user acknowledgement is received prior to the TTL value associated with a particular user notification expiring, etc.).

For example, in the exemplary IoT environment shown in FIG. 7, the home IoT sub-network 710 includes a door sensor 721, a backyard proximity sensor 722, patio lights 723, a fridge 724, a microwave 725, a thermostat 726, and a sprinkler system 727, which may each correspond to a respective IoT device in a local proximal cloud that the IoT SuperAgent 712 manages and controls. Accordingly, the IoT SuperAgent 712 may maintain one or more user activity and proximity trails based on one or more user activity and/or proximity indicators that may be received from the door sensor 721, the backyard proximity sensor 722, the patio lights 723, the fridge 724, the microwave 725, the thermostat 726, the sprinkler system 727 and/or any other IoT devices located in the home IoT sub-network 710. In that context, supposing that the microwave 725 detects an event that triggers a user notification, the microwave 725 may assign a severity or criticality level to the event and transmit a user notification 714 having a TTL value associated therewith to the IoT SuperAgent 712. For example, in various embodiments, the severity or criticality level may be assigned to the user notification 714 based on system defaults (e.g., severity or criticality levels associated with certain common events that may require user attention) and/or user-defined or custom criteria (e.g., users may modify the system defaults, create custom events that are associated with user-defined severity or criticality levels, etc.). In a similar respect, the TTL value associated with the user notification 714 may be determined based on the severity or criticality level in combination with one or more system defaults, user-defined criteria, and/or custom criteria. For example, the TTL value may specify a time period after which the notification 714 may be routed to external proximal clouds if no acknowledgement has been received prior to the TTL value expiring. As such, severe or critical notifications may have shorter TTL values to ensure that users are notified quickly, notifications with a low severity may longer shorter TTL values to avoid overhead from having to communicate with external proximal clouds, etc.

In various embodiments, in response to receiving the user notification 714 from the microwave 725, the IoT SuperAgent 712 associated with the home IoT sub-network 710 may ascertain the number of target IoT devices to notify based on the severity or criticality level associated with the notification 714 and/or user context information. For example, the IoT SuperAgent 712 may determine whether to notify the sprinkler system 727 based on the severity or criticality level associated with the incoming notification 714 in order to avoid misuse (e.g., do not notify the sprinkler system 727 unless the notification 714 has a high severity or criticality level to avoid alerting neighbors about conditions that may exist within the home). In another example, supposing that the IoT SuperAgent 712 routes an external notification 718 to the IoT SuperAgent 732 in the car IoT sub-network 730, the IoT SuperAgent 732 may determine whether to route the notification 718 to a multimedia or infotainment system 743 and/or cause one or more seat sensors 742 to vibrate based on a current user context (e.g., avoiding routing the notification 718 in a manner that may cause distractions to a driver if the notification 718 has a low severity or criticality).

Furthermore, in various embodiments, the IoT SuperAgent 712 may determine whether to only route internal notifications 716 within the local proximal cloud and/or whether to reach out to the external proximal clouds 730, 750 based on the severity or criticality level associated with the incoming notification 714 and/or whether one or more users are present in the local proximal cloud 710. For example, in various embodiments, the IoT SuperAgent 712 may route internal notifications 716 and external notifications 718 to report an incoming notification 714 having a high severity or criticality level. In another example, the IoT SuperAgent 712 may route internal notifications 716 and external notifications 718 if the only users present in the local proximal cloud 710 are children and the parents are away from home. In still another example, the IoT SuperAgent 712 may initially route only internal notifications 716 if the target users are present in the local proximal cloud 710 and the incoming notification 714 has a low severity or criticality level and subsequently route external notifications 718 if the TTL values associated with the internal notifications 716 expires without acknowledgement from a user. However, those skilled in the art will appreciate that the above examples are for illustration purposes only and that various criteria and/or combinations of factors may be used to ascertain the number of IoT devices to notify, the proximal clouds in which to route the notifications, the particular IoT devices to notify, and so on.

Referring now to the particular example shown in FIG. 7, the microwave 724 may specify that the notification 714 transmitted to the IoT SuperAgent 712 has a high severity or criticality to represent an emergency condition that requires prompt attention, whereby the microwave 725 may further specify an appropriate TTL value associated with the notification 714 based on the emergency condition. In various embodiments, based on the user activity and proximity trail, the IoT SuperAgent 712 may determine that one or more users are present outside based on a proximity indicator received from the door sensor 721, the backyard proximity sensor 722, and/or another suitable IoT device in the home IoT sub-network 710. Accordingly, the IoT SuperAgent 712 may route an internal notification 716 to the patio lights 723 and the sprinkler system 727, wherein the internal notification 716 may cause the patio lights 723 to blink continuously and cause the sprinkler system 727 to spray water on and off continuously in order to indicate the emergency condition. Further, the IoT SuperAgent 712 may route an external notification 718 to the IoT SuperAgent 732 in the car IoT sub-network 730 and the IoT SuperAgent 752 in the office IoT sub-network 750 based on the severity or criticality level and/or the users that are present in the local proximal cloud 710. For example, in various embodiments, the IoT SuperAgent 712 may automatically route severe or critical notifications 718 to the external proximal clouds 730, 750. In another example, a user hierarchy may be defined whereby the IoT SuperAgent 712 automatically routes severe or critical notifications 718 to the external proximal clouds 730, 750 if the users present in the local proximal cloud 710 have a low ranking in a hierarchy (e.g., children) or alternatively only routes severe or critical notifications 718 to the external proximal clouds 730, 750 if the users present in the local proximal cloud 710 have a higher ranking in the hierarchy (e.g., adults) and fail to acknowledge the internal notifications 716 before the TTL values associated therewith expire. In any case, in the event that the IoT SuperAgent 712 routes the external notification 718 to the IoT SuperAgent 732 in the car IoT sub-network 730 and the IoT SuperAgent 752 in the office IoT sub-network 750, the respective IoT SuperAgents 732, 752 may then route the external notification 718 within the respective local proximal clouds 730, 750 associated therewith (e.g., the IoT SuperAgent 732 may route the external notification 718 to an infotainment system 743 that may display an emergency alert until acknowledged, the IoT SuperAgent 752 may route the external notification 718 to an office lighting system 763 that may blink continuously until acknowledged, etc.). Furthermore, in the event that the IoT SuperAgent 732 and/or the IoT SuperAgent 752 receive an acknowledgement of the notification 718, the appropriate IoT SuperAgent 732, 752 may notify the IoT SuperAgent 712 in the local proximal cloud 710 where the notification 714 originated such that the IoT SuperAgent 712 can dismiss the internal notifications 716, update the user activity and proximity trail accordingly based on knowledge about the current presence associated with the acknowledging user, take further action to communicate with the acknowledging user based on the IoT SuperAgent 732, 752 in communication with the IoT device that received the acknowledgement, etc.).

Figure 8:
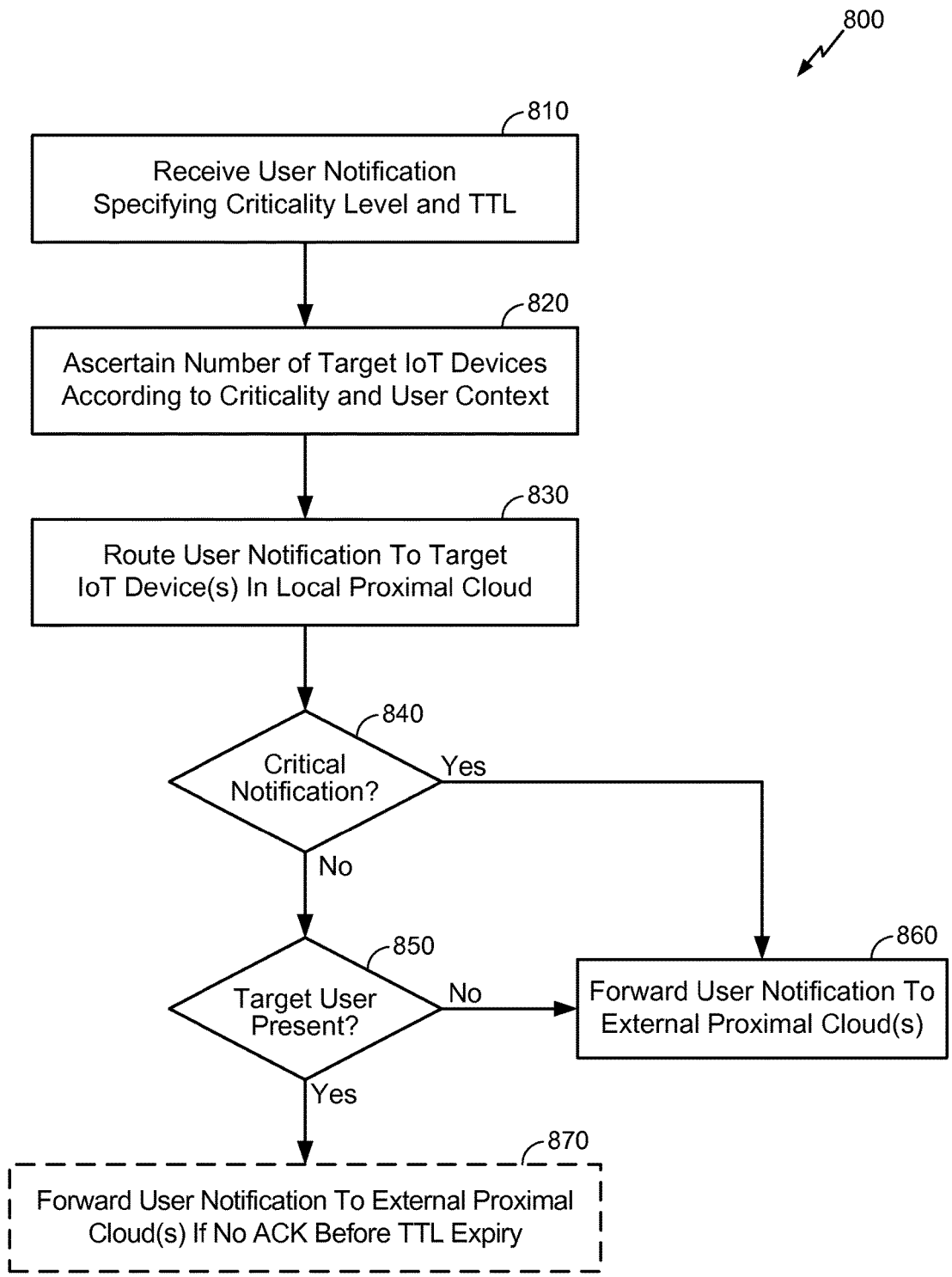
FIG. 8 illustrates an exemplary method that may be used to route notifications to one or more IoT devices in a local proximal cloud and/or one or more external proximal clouds, according to one aspect of the disclosure.

According to one aspect of the disclosure, FIG. 8 illustrates an exemplary method 800 that may be used to route notifications to one or more IoT devices in a local proximal cloud and/or one or more external proximal clouds. More particularly, at block 810, a user notification may be received from one or more IoT devices (e.g., at an IoT SuperAgent), wherein the received user notification may specify a severity or criticality level and a time-to-live (TTL) value that relates to a duration after which the user notification should be forwarded to an external proximal cloud if a message acknowledging the user notification has not been received within a local proximal cloud in which the user notification originated. In various embodiments, a number of target IoT devices to receive the user notification may be ascertained at block 820, wherein the number of target IoT devices to receive the user notification may be ascertained based on the severity or criticality level associated with the user notification and/or other suitable user context information. The user notification may then be routed to one or more target IoT devices in the local proximal cloud where the user notification originated at block 830. For example, in various embodiments, the user notification may be routed to the target IoT devices in the local proximal cloud according to techniques substantially similar to those discussed above with respect to FIGS. 5-6.

In various embodiments, a determination may then be made at block 840 as to whether the user notification has a severe or critical status, in which case the user notification may be routed to one or more external proximal clouds at block 860. Alternatively, even if the user notification does not have a severe or critical status, the user notification may be routed to one or more external proximal clouds at block 860 in response to determining that a target user intended to receive the notification is not present in the local proximal cloud, which may be determined based on the user activity and proximity trail described in further detail above. In various embodiments, assuming that the notification does not have a severe or critical status and that the target user intended to receive the notification is present in the local proximal cloud, the local proximal cloud may be monitored to determine whether a message acknowledging the notification routed within the local proximal cloud has been received. Accordingly, in response to determining that a message acknowledging the notification has not been received within the local proximal cloud before the TTL value associated therewith has expired, the user notification may be routed to one or more external proximal clouds at optional block 870. However, if a message acknowledging the notification is received within the local proximal cloud before the TTL value associated therewith has expired, the user notification need not be routed to the one or more external proximal clouds at optional block 870. Furthermore, in the event that the acknowledgement message is received, whether from within the local proximal cloud or a particular external proximal cloud, the user activity and proximity trail may be appropriately updated to reflect the knowledge about the current user presence.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for routing Internet of Things (IoT) notifications, comprising:
configuring a plurality of IoT devices to monitor for user presence in an IoT environment having a plurality of personal spaces in which the plurality of IoT devices are located;
tracking, at a gateway node in the IoT environment, indicators that the plurality of IoT devices send within the IoT environment when the user presence is detected, wherein each indicator sent within the IoT environment relates to at least one of an active trailing event in which one or more users directly or indirectly interacted with one of the plurality of IoT devices or a passive trailing event in which the one or more users were detected in proximity to one of the plurality of IoT devices equipped with a user proximity or presence sensor;
establishing, at the gateway node, a user activity and proximity trail from the tracked indicators sent within the IoT environment over a recent time period such that the established user activity and proximity trail reflects knowledge about one or more activities and one or more locations of the one or more users over the recent time period;
receiving, at the gateway node, one or more user notifications from a first IoT device among the plurality of IoT devices in the IoT environment, wherein the first IoT device is located in a first one of the plurality of personal spaces and the one or more user notifications are related to a change in a current operational state at the first IoT device;
determining, at the gateway node, that the one or more users are present in a second one of the plurality of personal spaces based on a probabilistic determination with reference to the established user activity and proximity trail and behavior patterns of the one or more users; and
routing, by the gateway node, the one or more user notifications to a second IoT device located in the second personal space based on the second IoT device having one or more capabilities suitable to inform the one or more users about the change in the current operational state at the first IoT device.

2. The method recited in claim 1, wherein the second IoT device comprises one of the plurality of IoT devices in the IoT environment that most recently sent an indicator that the user presence was detected.

3. The method recited in claim 1, wherein routing the one or more user notifications to the second IoT device comprises translating the one or more user notifications into a format based on the one or more capabilities that the second IoT device has to inform the one or more users about the change in the current operational state at the first IoT device.

4. The method recited in claim 1, further comprising:
expiring one or more of the tracked indicators from the user activity and proximity trail according to one or more rules.

5. The method recited in claim 1, further comprising:
determining a severity or criticality level associated with the one or more user notifications;
identifying one or more users present in a local proximal cloud that includes at least the first personal space based on the user activity and proximity trail; and
routing the one or more user notifications based on the determined severity or criticality level in combination with the one or more users present in the local proximal cloud that includes the first personal space.

6. The method recited in claim 5, wherein routing the one or more user notifications further comprises:
routing the one or more user notifications to a proximal cloud external to the first personal space in response to determining that the one or more user notifications have a high severity or criticality level.

7. The method recited in claim 5, wherein routing the one or more user notifications further comprises:
routing the one or more user notifications within the local proximal cloud in response to determining that the one or more user notifications do not have a high severity or criticality level; and
routing the one or more user notifications to a proximal cloud external to the first personal space in response to determining that a message acknowledging the one or more user notifications has not been received prior to a time-to-live associated with the one or more user notifications expiring.

8. The method recited in claim 5, wherein routing the one or more user notifications further comprises:
routing the one or more user notifications to a proximal cloud external to the first personal space in response to determining that the one or more users present in the local proximal cloud have a low ranking in a user hierarchy.

9. The method recited in claim 5, further comprising:
ascertaining a number of IoT devices to receive the one or more user notifications according to the determined severity or criticality level in combination with user context information based on the user activity and proximity trail.

10. The method recited in claim 1, further comprising:
receiving a message acknowledging the one or more user notifications; and
updating the user activity and proximity trail according to the message acknowledging the one or more user notifications, wherein the user activity and proximity trail is updated to confirm that the one or more users are in current proximity to the second IoT device.

11. An apparatus, comprising:
a receiver configured to receive indicators that a plurality of Internet of Things (IoT) devices are configured to send when user presence is detected in an IoT environment having a plurality of personal spaces, wherein each indicator relates to at least one of an active trailing event in which one or more users directly or indirectly interacted with one of the plurality of IoT devices or a passive trailing event in which the one or more users were detected in proximity to one of the plurality of IoT devices equipped with a user proximity or presence sensor;
one or more processors configured to:
establish a user activity and proximity trail from the tracked indicators sent within the IoT environment over a recent time period such that the established user activity and proximity trail reflects knowledge about one or more activities and one or more locations of the one or more users over the recent time period;

receive, via the receiver, one or more user notifications from a first IoT device among the plurality of IoT devices in the IoT environment, wherein the first IoT device is located in a first one of the plurality of personal spaces and the one or more notifications are related to a change in a current operational state at the first IoT device; and determine that the one or more users are present in a second one of the plurality of personal spaces based on a probabilistic determination with reference to the established user activity and proximity trail and behavior patterns of the one or more users; and a transmitter configured to route the one or more user notifications to a second IoT device located in the second personal space, the second IoT device determined based on the second IoT device having one or more capabilities suitable to inform the one or more users about the change in the current operational state at the first IoT device.

12. The apparatus recited in claim 11, wherein the second IoT device comprises one of the plurality of IoT devices in the IoT environment that most recently sent an indicator that the user presence was detected.

13. The apparatus recited in claim 11, wherein the one or more processors are further configured to translate the one or more user notifications into a format based on the one or more capabilities that the second IoT device has to inform the one or more users about the change in the current operational state at the first IoT device.

14. The apparatus recited in claim 11, wherein the one or more processors are further configured to expire one or more of the tracked indicators from the user activity and proximity trail according to one or more rules.

15. The apparatus recited in claim 11, wherein the one or more processors are further configured to:

determine a severity or criticality level associated with the one or more user notifications; and identify one or more users present in a local proximal cloud that includes at least the first personal space based on the user activity and proximity trail, wherein the one or more user notifications are routed based on the determined severity or criticality level in combination with the one or more users present in the local proximal cloud that includes the first personal space.

16. The apparatus recited in claim 15, wherein the transmitter is further configured to route the one or more user notifications to a proximal cloud external to the first personal space in response to the one or more user notifications having a high severity or criticality level.

17. The apparatus recited in claim 15, wherein the transmitter is further configured to:

route the one or more user notifications within the local proximal cloud in response to the one or more processors determining that the one or more user notifications do not have a high severity or criticality level; and route the one or more user notifications to a proximal cloud external to the first personal space in response to the one or more processors determining that a message acknowledging the one or more user notifications has not been received prior to a time-to-live associated with the one or more user notifications expiring.

18. The apparatus recited in claim 15, wherein the transmitter is further configured to route the one or more user notifications to a proximal cloud external to the first personal space in response to the one or more users present in the local proximal cloud having a low ranking in a user hierarchy.

19. The apparatus recited in claim 15, wherein the one or more processors are further configured to ascertain a number of IoT devices to receive the one or more user notifications according to the determined severity or criticality level in combination with user context information based on the user activity and proximity trail.

20. The apparatus recited in claim 11, wherein the one or more processors are further configured to update the user activity and proximity trail according to a message received at the receiver to acknowledge the one or more user notifications, wherein the user activity and proximity trail is updated to confirm that the one or more users are in current proximity to the second IoT device.

21. The apparatus recited in claim 11, wherein the apparatus comprises a device that provides gateway functionality in the IoT environment.

22. The apparatus recited in claim 11, wherein the apparatus comprises a server.

23. An apparatus, comprising:

means for configuring a plurality of Internet of Things (IoT) devices to monitor for user presence in an IoT environment having a plurality of personal spaces in which the plurality of IoT devices are located;

means for tracking indicators that the plurality of IoT devices send within the IoT environment when the user presence is detected, wherein each indicator sent within the IoT environment relates to at least one of an active trailing event in which one or more users directly or indirectly interacted with one of the plurality of IoT devices or a passive trailing event in which the one or more users were detected in proximity to one of the plurality of IoT devices equipped with a user proximity or presence sensor;

means for establishing a user activity and proximity trail from the tracked indicators sent within the IoT environment over a recent time period such that the established user activity and proximity trail reflects knowledge about one or more activities and one or more locations of the one or more users over the recent time period;

means for receiving one or more user notifications from a first IoT device among the plurality of IoT devices in the IoT environment, wherein the first IoT device is located in a first one of the plurality of personal spaces and the one or more user notifications are related to a change in a current operational state at the first IoT device;

means for determining that the one or more users are present in a second one of the plurality of personal spaces based on a probabilistic determination with reference to the established user activity and proximity trail and behavior patterns of the one or more users; and means for routing the one or more user notifications to a second IoT device located in the second personal space based on the second IoT device having one or more capabilities suitable to inform the one or more users about the change in the current operational state at the first IoT device.

24. A non-transitory computer-readable storage medium having computer-executable instructions for routing Internet of Things (IoT) notifications recorded thereon, wherein executing the computer-executable instructions on a processor causes the processor to:

configure a plurality of IoT devices to monitor for user presence in an IoT environment having a plurality of personal spaces in which the plurality of IoT devices are located;

track indicators that the plurality of IoT devices send within the IoT environment when the user presence is detected, wherein each indicator sent within the IoT environment relates to at least one of an active trailing event in which one or more users directly or indirectly interacted with one of the plurality of IoT devices or a passive trailing event in which the one or more users were detected in proximity to one of the plurality of IoT devices equipped with a user proximity or presence sensor;

establish a user activity and proximity trail from the tracked indicators sent within the IoT environment over a recent time period such that the established user activity and proximity trail reflects knowledge about one or more activities and one or more locations of the one or more users over the recent time period;

receive one or more user notifications from a first IoT device among the plurality of IoT devices in the IoT environment, wherein the first IoT device is located in a first one of the plurality of personal spaces and the one or more user notifications are related to a change in a current operational state at the first IoT device; and determine that the one or more users are present in a second one of the plurality of personal spaces based on a probabilistic determination with reference to the established user activity and proximity trail and behavior patterns of the one or more users; and route the one or more user notifications to a second IoT device located in the second personal space based on the second IoT device having one or more capabilities suitable to inform the one or more users about the change in the current operational state at the first IoT device.

* * * * *